H. Murch,
Mop Holder.
No. 3,188. Reissued Nov. 10, 1868.
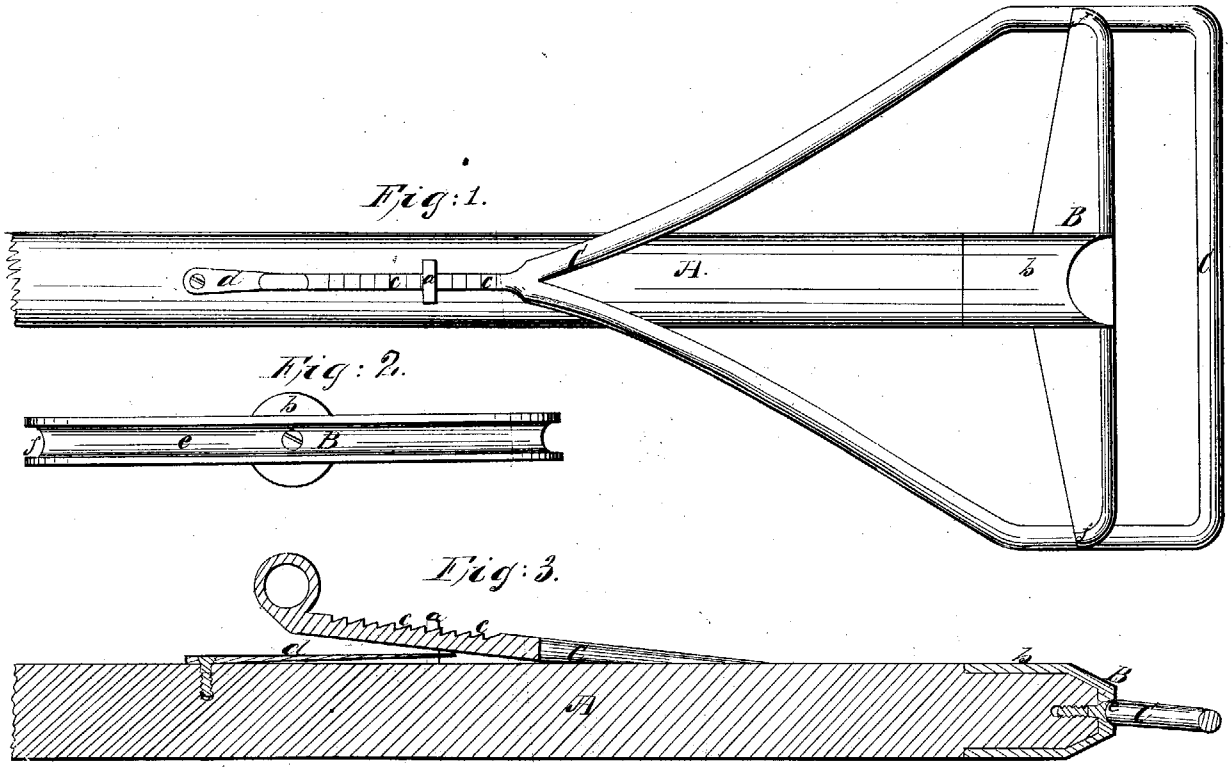
N. PETERS, PHOTO-LITHOGRAPHER, WASHINGTON, D. C.

United States Patent Office.

COLBY BROTHERS AND COMPANY, OF WATERBURY, VERMONT, ASSIGNEES, BY MESNE ASSIGNMENTS, OF HARVEY MURCH.

*Letters Patent No.* 9,781, *dated June* 14, 1853; *extended seven years; reissue No.* 2,957, *dated June* 2, 1868: *reissue No.* 3,188, *dated November* 10, 1868.

IMPROVED MOP-HEAD.

The Schedule referred to in these Letters Patent and making part of the same.

*To all whom it may concern:*

Be it known that HARVEY MURCH, of Lebanon, in the county of Grafton, and State of New Hampshire, did obtain Letters Patent, dated June 14, 1853, on a new and useful Improvement in Mop-Heads, which Letters Patent were extended seven years from June 14, 1867, and, by virtue of assignments duly recorded in Patent Office, reissued, June 2, 1868, to COLBY BROTHERS & COMPANY, of Waterbury, in the county of Washington, and State of Vermont, who, for the purpose of a further reissue, do hereby declare that the following, taken in connection with the accompanying drawings, is a full, clear, and exact description thereof.

In the drawings, which represent a mop-head and handle made according to the principles of this invention—

Figure 1 is a plan of the whole;

Figure 2, an end view of the cross-head; and

Figure 3, a longitudinal section through the whole contrivance.

Prior to the date of this invention, mop-heads were made in which the cross-head was secured in the handle, sometimes by a socket, making part of the cross-head, sometimes by a pin or rod, making part of the cross-head and entering a hole in the handle; and mops having socketed cross-heads were provided with a binder, screwed at both ends, and having two nuts which bore upon the ends of the cross-heads. The other kind of cross-head was, in some cases, provided with a binder whose ends were united together, somewhat as shown in the drawings, but the united ends were, as far as is known, secured upon the pin or rod, and not upon the handle itself.

This mop-head combines some of these old features, and has some new features.

In this mop-head, the cross-head B is provided with a socket, *b*, the whole made, by preference, in one piece, driven upon and enclosing the end of the handle A, the attachment of the cross-head to the handle being thus strong and tolerably firm, much stronger than if a bolt or pin, attached to or making part of the cross-head, entered a hole in the handle.

This kind of cross-head, which is called a socket cross-head, is, by preference, grooved at the two ends, to guide and steady the binder at *f f*, and also longitudinally, from end to end, as at *e*, (see fig. 2,) so as to gripe more firmly the rags, fibres, &c., of the mop.

The binder, shown at C C, has the two ends thereof united, so that a single fastening will hold the whole binder in place, compressing or clamping the rags, pieces of rope, fibres, &c., between it and the cross-head; and it is preferred to secure the binder, not to the socket, but to the handle, for the reason that, when so secured, those parts of the binder, extending from the ends of the cross-head, form, when the rags, &c., are compressed or clamped, braces or guys, extending from the cross-head to the handle, thereby aiding in holding or sustaining the cross-head in place, strengthening it to resist concussions during use, and, if the socket should become loose, actually sustaining and bracing the cross-head firmly in place. If the united ends of the binder were secured to the socket, they would only strengthen the cross-head, and not perform the other offices.

The end of the binder, shown in the drawings, is notched at *c c*, as there represented, and is pressed by a spring, *d*, against the staple-catch *a*; the object of the whole contrivance being to confine or secure the binder in such a position as to compress or clamp the rags, &c., to prevent the united ends thereof from moving laterally or crosswise of the handle to any great extent, and to permit of motion, when desired, in the direction of the length of the handle, so that rags, fibres, &c., constituting the mop may be clamped and unclamped.

We do not claim, as the invention of HARVEY MURCH, either a socketed cross-head by itself, or a binder having the two ends united through an intervening piece, so that a single fastening will hold it in place; nor do we claim fastening the binder upon a shaft between the handle and socketed cross-bar; but we do claim—

1. The combination of a socketed cross-head with a rigid binder, that is to say, one having rigid or inflexible ends connected directly to each other, substantially as and for the purpose specified.

2. The combination of a socketed cross-head with a rigid binder, having its ends connected directly together, and a single fastening for holding the binder to the handle itself in such a position as to clamp rags, &c., substantially as and for the purposes set forth.

3. The combination of a socketed cross-head, handle, and a metallic binder, having rigid or inflexible ends connected directly to each other, constructed and arranged in such manner that the rigid or inflexible ends will be allowed to move freely by a graduated movement up and down on or over the handle itself, or the socket thereon, and hold or aid in holding the cross-head to the handle when the parts are in clamping position, substantially as set forth.

4. The combination of a metallic cross-head with a handle and a rigid metallic binder, having inflexible ends connected directly with each other, constructed or arranged in such manner that the rigid or inflexible ends of the binder will be allowed to move freely up and down on the handle, or a metallic socket thereon, so as to hold or aid in holding the cross-head to the handle when the parts are in clamping position, substantially as set forth.

5. The combination of a metallic cross-head, socket, handle, and a metallic binder, having rigid or inflexible ends, connected directly together, the latter being constructed or arranged in such manner that the rigid or inflexible ends will be allowed to move freely up and down on or over the handle itself, or the socket thereon, and hold or aid in holding the cross-head to the handle when the parts are in clamping position, substantially as set forth.

The above specification of this invention signed by us, this 20th day of October, 1868.

COLBY BROTHERS AND COMPANY,
By GEO. J. COLBY, *President.*

Witnesses:
J. J. COLBY,
CURTIS WELLS.